Feb. 25, 1941.  A. F. ARCIER ET AL  2,233,191
AIRCRAFT LANDING GEAR
Filed March 8, 1938   2 Sheets-Sheet 1

INVENTOR.
MAX P. BAKER &
A. FRANCIS ARCIER.
BY
ATTORNEY.

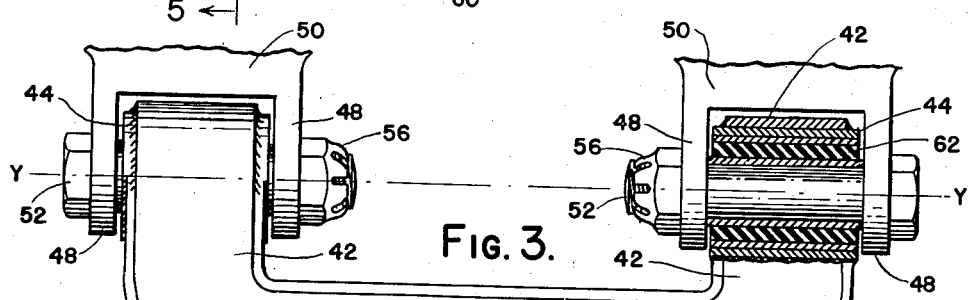

Patented Feb. 25, 1941

2,233,191

UNITED STATES PATENT OFFICE 2,233,191

AIRCRAFT LANDING GEAR

Alex Francis Arcier, Dayton, and Max P. Baker, Tippecanoe City, Ohio, assignors to Waco Aircraft Company, a corporation of Ohio Application March 8, 1938, Serial No. 194,526

8 Claims. (Cl. 244—104)

This invention relates to aircraft landing gears and more particularly to an improved wheel support assembly and the method of mounting to the aircraft body.

An important object of this invention is to produce an improved shock absorbing landing gear of the non-retractible type. To accomplish this the triangle sides formed by the pivotally mounted struts are proportioned and positioned to produce a vertical wheel travel much greater than the incorporated shock absorber actually telescopes. This improved construction results in a very soft-acting, long-travel, wide-tread landing gear which, due to the relatively flat slope of the radius strut with respect to the ground, also employs the lateral travel of the wheel as a partial snub against rebound.

Another object is to provide an improved means of attaching the pivoted struts to the fuselage structure in the form of resilient shackles by which they are adapted to further absorb shocks and landing stresses; and to provide such pivoted attachments which are free from noise and wear and which are easily assembled. A further object is to provide a wheel-carrying axle member forming an integral part of the shock absorber and having a portion linked to a radius rod in such a manner that it counteracts bending moments in the shock absorber.

With the above and other objects in view, the invention consists in the construction, combination and arrangement of parts as will be hereinafter more fully described, illustrated in the accompanying drawings and defined within the scope of the appended claims.

In the drawings:

Fig. 3 is an elevation of the mounting shackle of the shock strut;

Fig. 4 is a longitudinal section of an elastic element of the mounting shackle;

Fig. 5 is a transverse section of the same taken along the line 5—5 of Fig. 4; and Figs. 6 and 7 are illustrations of modified mounting shackles.

Figure 1:
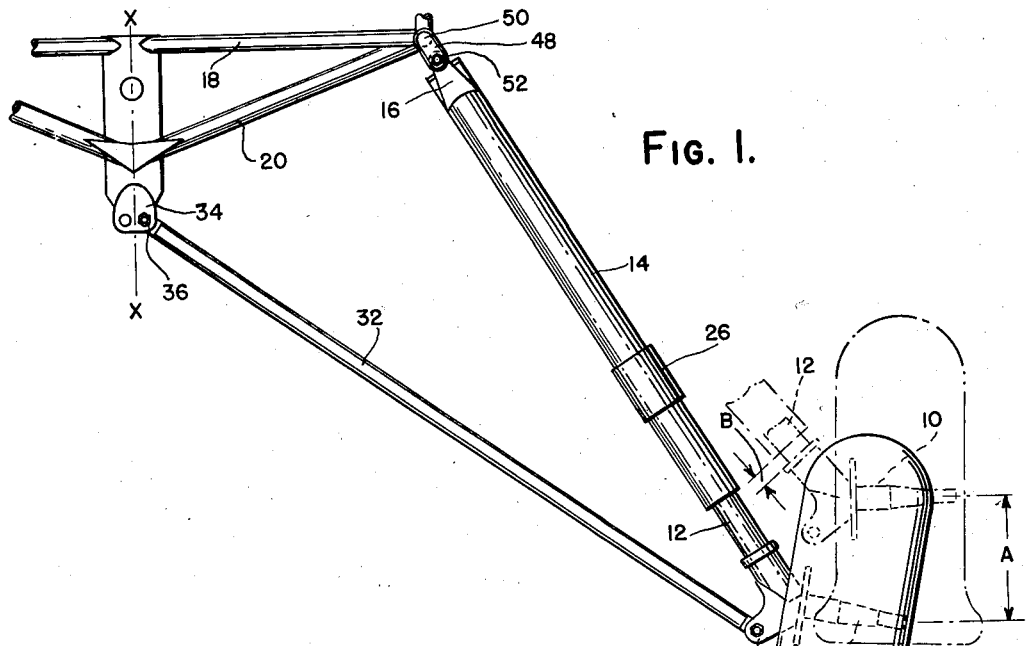
Fig. 1 is a front elevation of one side of the landing gear structure.

In a landing gear constructed according to this invention the wheel axle 10 is a rigid continuation of the lower strut or piston element 12 which is telescopically mounted in a slidable but non-rotatable relation in an upper or casing element 14. The elements 12 and 14 form a telescopic shock absorbing strut of the oleo or other suitable type adapted to resiliently oppose compression under landing or taxiing impacts. The upper element 14 is capped by a double shackle fitting 16 which will be later described in detail. Its construction and function, however, is such as to hingedly attach the landing gear to the fuselage frame members 18 and 20 so as to prevent axial rotation of the strut 14 and thus maintain the proper toe of the landing wheel 22 while permitting pivotal movement thereof transversely of the longitudinal axis of the aircraft. The structure shown in Fig. 1 is obviously but one half of the complete landing gear assembly, there being a similar assembly symmetrically disposed on the other side of the center line X—X or plane of symmetry of the aircraft.

The landing gear strut 14 is additionally and externally braced against forward and rearward motion through a rearwardly inclined drag strut 24. By means of a collar 26, fixedly attached to the strut 14, a pivotal connection is made at 28 to the strut 24 while at its other end pivotal attachment is made to the fuselage structure as by the fitting 30 which also may be of the improved construction as fitting 16, which is hereinafter to be more fully described. The member 24 serves to reduce fore and aft loads on the strut 14 and its mounting 16.

Restraint against lateral displacement of the wheel 22, axle 10 and telescopic strut assembly 12—14 is accomplished by the radius rod 32, hingedly attached to the aircraft structural member 34 as by the pivot 36 located substantially centrally of the fuselage at some distance from the main strut attachment 16. At its lower end the rod 32 is pivotally attached to suitable lugs 38 integrally formed with the axle 10 and the strut 12. The lugs 38 project inwardly and downwardly in such relation to the axle and shock strut axes as to counteract an arbitrary percentage of the bending moments in the shock strut resulting from wheel loads. The strut 24 and rod 32, its manner of attachment, and the improved lug relationship of the unitary axle 10, relieves the shock absorber 12—14 of substantially all but its normal axially applied loads.

In the arrangement of this landing gear as just described, the triangle sides 14, 24 and 32 are so proportioned and arranged as to produce a vertical travel "A" of the wheel 22 which is much greater than the distance "B" which the shock strut 12—14 actually telescopes. This results in an easy-acting, long-travel, wide-tread landing gear construction which permits the negotiation of safer and steadier landings, even under adverse and rough air and ground conditions.

Figure 2:
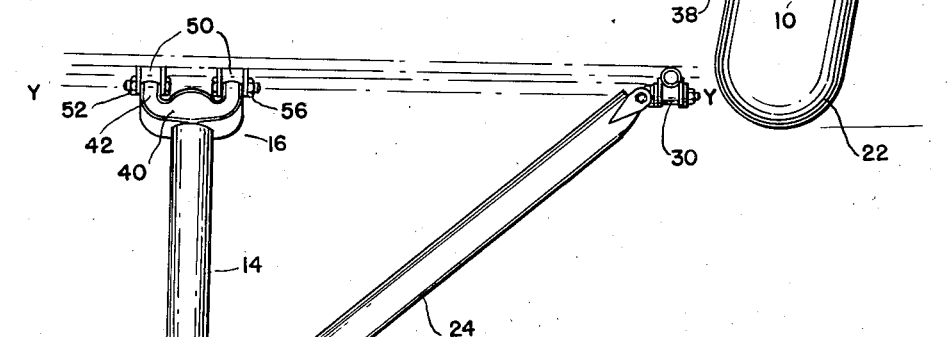
Fig. 2 is a side elevation of the same.
Figure 2:
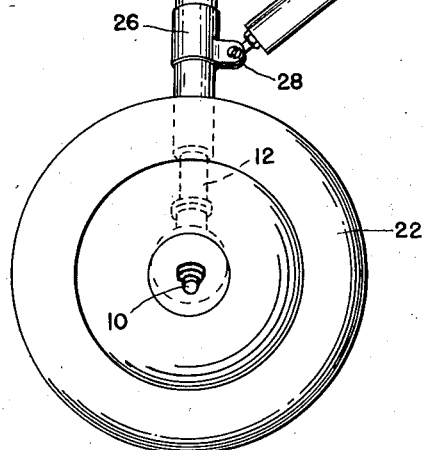

The double shackle element 16 by which the landing gear is pivotally attached to the fuselage structure, comprises a cap member 40 on which are formed two identical upstanding arms 42 each of which are pierced by a cylindrical bore centered on the hinge axis Y—Y. (See Fig. 2.) Inserted within this bore are hardened steel sleeves 44 which are psitioned centrally therein and then welded to a permanent attachment. A composite sleeve 46 of such external diameter as to necessitate a forced fitting is then inserted within the steel sleeve 44. The entire fitting assembly may then be inserted between the spaced arms 48 of the bifurcated fitting 50 which is rigidly attached to the fuselage structural members in any suitable manner. A headed bolt 52 may then be passed through aligned bores in the arms 48, in addition to being forced through the interior 54 of the sleeve 46, following which it is secured in place by a lock nut 56.

The sleeve 46 (Figs. 3 to 5 inclusive) is composed of inner and outer cylindrical metallic sleeves 58 and 60 respectively. These sleeves are of such difference in diameter as to provide space for a rubber or other elastic filler or annular core 62 which is adhesively or otherwise bonded to both of said metallic sleeves so that suitable relative torsional motion between the sleeves 58 and 60 is possible within the elastic core without any such relative motion occurring between said filler and either of the metallic sleeves at the surfaces contacting the bolt 52 or the interior of sleeve 44. In this connection it should be noted that the sleeve 44 is an integral part of the strut 14 and that the sleeve 58 preferably projects slightly beyond the sleeve 60 and filler 62 at each end whereby it is adapted to be securely held against rotation between the arms 48 when the nut 56 is sufficiently tightened so that these arms deflect slightly toward each other and grip the said sleeve 58. Instead of vulcanizing or adhesively bonding the filler 62 to the sleeves 58 and 60, matched axial serrations in the filler and one or both of the steel sleeves may be employed. Such construction will provide a sufficient bond against torsional forces in some instances, particularly when such a shackle is assembled under elastic pressure. Tapering or diagonally serrated sleeves assembled oppositely to each other, constitute a convenient method of creating the desired pressure in the elastic filler, and thus is prevented any relative motion between adjoining parts and hence wear at such contact surfaces. An alternate construction contemplates omitting the sleeves 58 and 60 in which case the serrations are broached directly into the sleeve 44 and bolt 52.

The applicants have discovered as a result of repeated experiments that with the proper dimensions of elastic filler a relatively small shackle is capable of withstanding a radial load of twenty thousand pounds (axial and bending load in the strut) while under a torsional deflection between the inner and outer metallic sleeves of as much as 10°.

The applicants have also discovered that it is beneficial to the operation and life of the elastic filler to position the metallic sleeves while the strut 14 is in the angular relation to the aircraft which it attains when under its greatest forces, as in this way the elastic medium 62 is subjected to the greatest radial loads when under the least torsional deflection and vice versa. This is accomplished by attaching the landing gear to the completed aircraft with the pivot parts in loose relationship following which the aircraft is subjected to a loading substantially equal to that of its greatest service loading. This will cause the landing gear to spread outwardly against the restraint of the tie rod 32 as well as to cause the strut portion 12 to telescope into the strut portion 14. In this position, as shown by the dotted lines of Fig. 1, the landing gear will be in its greatest normal deflection in a torsional sense about the pivotal axis Y—Y of Fig. 3. The nuts 56 are then tightened so that the torsionally unstressed elastic element 60 is held in a fixed relationship between the forked arms 48 by reason of their frictional contact with the ends of the sleeve 58. Thus with this arrangement the landing gear shackle undergoes the greatest radial loads when under the least torsional deflection and vice versa.

In Figures 6 and 7 are shown single shackle types suitable for use in connecting auxiliary struts or braces. It is contemplated that the fittings 30 and 36 of Figure 2 be of this type and that this invention provides for the use of such resilient shackles in every practical employment in aircraft where similar conditions exist and the advantages of this invention are desired.

Having thus described our invention, what we claim is:

1. In an aircraft, a body, a landing gear comprising main struts of fixed length depending from each side of the body, diagonal tie members pivotally connected to the body and to the said struts intermediate their length, a separate wheel carrying member on each side of the body each having an upwardly extending end slidably guided by one of said struts, and other tie members arranged transversely of said body to extend diagonally therefrom to pivotal connection with the said wheel carrying member.

2. In an aircraft, a body, a landing gear comprising main struts of fixed length depending from each side of the body, diagonal tie members pivotally connected to the body and to the said struts intermediate their length, a separate wheel carrying member on each side of the body each having an end upwardly extending from the axle portion which is slidably guided by one of said struts, means resiliently controlling the movement of said wheel carrying member, and other tie rods arranged transversely of said body to extend diagonally therefrom to pivotal connection with said wheel carrying member at a point spaced from and below the intersection of the axes of the axle portion and of said main strut.

3. In an aircraft, a landing gear unit comprising a main strut of fixed length depending from the aircraft, a longitudinally disposed diagonal brace pivotally connected to the aircraft and to the said strut intermediate its length, a separate wheel carrying member having an end upwardly extending from the axle portion so as to be telescopically associated with said main strut, means resiliently controlling the movement of said wheel carrying member, a tie rod arranged transversely of said aircraft to extend from a pivotal connection thereon transversely to a second pivotal connection with said wheel carrying member at a point spaced from and below the intersection of the axes of the axle portion and of said main strut.

4. An aircraft landing gear comprising a main strut equipped with a telescopic lower portion terminating in a stub axle, a ground engaging member carried by said axle, a rearwardly extending brace strut pivotally joined to the upper portion of said main strut, and a tie member arranged transversely with respect to the plane of said ground engaging member to extend to pivotal connection with said telescopic lower portion at a point spaced from and below the intersection of the axes of the axle and of said main strut.

5. In an aircraft, a body, a landing gear comprising a main strut of fixed length depending from the body, a diagonal tie member pivotally connected to the body and to the said main strut, a structural member having an upwardly extending end slidably guided by said main strut, a ground engager carried by said structural member, and a second tie member arranged transversely of said first tie member to extend diagonally to pivotal connection with the said structural member.

6. An airplane landing gear including a laterally movable acute-angular frame, said frame being pivotally mounted with its pivot axis extended in a fore and aft direction, one member of said angular frame being extended to receive in telescopic relation a strut element, a ground engager carried by said strut element to be bodily movable with said frame and a radius rod associated with said strut element to constain the pivotal movement of said frame.

7. An aircraft landing gear including a laterally movable framework, said framework being pivotally mounted on a longitudinal axis, a member of said framework being extended to receive in telescopic relation a strut element, a ground engager carried by said strut element, a radius rod associated with said strut element to limit the pivotal movement of said framework within a prescribed angle and means embodied in the pivotal mounting of said framework to resiliently affect movements of said framework within said prescribed angle.

8. In an aircraft, a body, a landing gear unit comprising a main strut of fixed length depending from the body, resilient pivotal means joining said strut to said body, a drag strut resiliently connected to the body and to the said main strut, a member having an upwardly extending end telescopically associated with said main strut, a ground engager carried by said member, and a radius rod connected to said member to limit the pivotal movement thereof and of said main strut, the said resilient pivotal means being so organized as to be torsionally unstressed when said member is substantially fully stressed in its telescoped attitude.

A. FRANCIS ARCIER.
MAX P. BAKER.